3,423,335
SYNTHETIC CROSS-LINKED POLYMERS

Leslie Nathan Phillips, Farnborough, England, assignor to National Research Development Corporation, London, England
No Drawing. Continuation-in-part of application Ser. No. 358,948, Apr. 10, 1964. This application Aug. 11, 1966, Ser. No. 571,689
Claims priority, application Great Britain, Apr. 10, 1963, 14,326/63
U.S. Cl. 260—2
Int. Cl. C08f *05/72, 27/00;* C08g *51/74*
10 Claims

ABSTRACT OF THE DISCLOSURE

Thermally stable, cross-linked polymers are obtained by reacting tractable linear polymers containing aromatic nuclei with paraxylylene dihalides. Aromatic containing cross-links are thus attached at the sites of hydrogen atoms nuclearly substituted on the aromatic nuclei of the tractable linear polymers without the necessity for activating groups in said aromatic nuclei.

---

The present invention relates to synthetic cross-linked polymeric materials and their manufacture and is a continuation-in-part of U.S. patent application Ser. No. 358,-948, filed Apr. 10, 1964, which was a continuation-in-part of U.S. patent application Ser. No. 206,201, filed June 29, 1962, both now abandoned.

Many properies of polymers such as hardness, mechanical strength and ductility are greatly dependent upon the extent of polymerisation of the polymer, and many polymers only display these desirable properties if their molecular weight is sufficiently high. Generally the attainment of a high molecular weight in a polymer is assisted by the formation of a cross-linked network of polymer chains. However, such polymers are not readily fabricated because in the formation of the cross-links they become insoluble, infusible and generally intractable.

In particular polymers containing a high proportion of aromatic nuclei are generally relatively stable and resistant to heat and cross-linking of aromatic polymers with aromatic cross-linking agents should provide products having desirable properties.

Throughout this specification the terms "polymer" and "cross-linked polymer" have the meanings assigned to them on pages 1 and 3 respectively, of the 1st edition of "Principles of High Polymer Theory and Practice," by Schmidt and Marlies.

It is an object of the present invention to provide an improved process which proceeds under mild reaction conditions for cross-linking aromatic polymeric materials to produce a highly cross-linked aromatic material having great inertness and stability in which process a wide range of both organic and inorganic polymers containing aromatic nuclei, either pendant on or incorporated in the polymer chain may be used as starting materials.

A further object of the invention is to provide a process by which aromatic polymers of high thermal stability are converted into cross-linked polymers in which the cross-links are themselves aromatic thereby retaining to a high degree the termal stability of the original aromatic polymers.

Another object of the invention is to provide highly cross-linked polymers that have a high adhesion to fibre surfaces.

Another object of the invention is to provide hard and rigid polymers of considerable stiffness and high Young's modulus that may be used in the production of reinforced structures.

The polymer to be cross-linked is advantageously a relatively low molecular weight polymer, that is to say a polymer containing an insignificant amount of cross-linking and generally having a molecular weight of 20,000 or less. Such polymers are tractable, which means that they are readily obtained in the liquid phase, by melting or by dissolving in a solvent.

In accordance with the present invention, a process for the manufacture of a cross-linked, thermally stable polymer comprises reacting at between about 150° and 500° C. a tractable linear polymer having a repeating structural unit

wherein M is a bivalent group containing an aromatic nucleus and H is a hydrogen atom nuclearly substituted on said aromatic nucleus, with a paraxylylene dihalide cross-linking agent represented by the structure

wherein X and Y are chlorine, bromine or iodine atoms. The tractable linear polymer chains are cross-linked by this process between respective aromatic hydrocarbon nuclei with elimination of the corresponding halogen acid, HX and HY. The resulting cross-linked polymer thus contains units having the structure

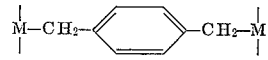

The preferred cross-linking agent is p-xylylene dichloride.

The process is applicable to a very wide range of tractable linear polymers which have an aromatic nucleus either pendent from or incorporated in the polymer backbone. The hydrogen atom which in the present process is eliminated from the aromatic nucleus of the tractable polymer during cross-linking does not, in contradistinction to previous attempts to cross-link aromatic polymers, require to be activated by a substituent present in the aromatic nucleus. Thus any available tractable linear polymer containing aromatic nuclei may be treated according to the present invention with every prospect of producing a cross-linked thermally stable polymer. The aromatic nuclei are advantageously unsubstituted benzenoid hyrocarbon nuclei. Although substituent groups may be present in the aromatic nuclei they must not be a strongly electron-withdrawing group, for example a nitro group. Other types of aromatic nuclei that may be used include ferrocene, thiophene, furan and some nitrogen-containing heterocycles.

Although the process may take place between 150° C. and 500° C., relatively mild heating between 150° C. and 250°C. is normally sufficient. Clearly the temperature must be kept below that at which the tractable linear resin decomposes.

The process may normally be catalysed by the addition of a Friedel-Crafts type of catalyst. Advantageously one of the milder Friedel-Crafts type catalysts is used and is generally added to the reaction mixture in a solution in o-dichlorobenzene or other suitable inert solvent, of 10% w./w. concentration. The concentration of catalyst in the reaction mixture itself is preferably less than 1 molar percent calculated on the amount of cross-linking agent present. A preferred catalyst is stannic chloride.

Although a mild catalyst is preferred, it has been found that a more violent Friedel-Crafts type catalyst, ferric chloride, may be modified and used successfully. Accordingly, processes in accordance with the present invention may be carried out in the presence of ferric chloride admixed with an organic complexing agent which is a tertiary amine such as triphenylamine in an organic solvent such as 1,2-dichloroethane or o-dichlorobenzene. Effective molar ratios of ferric chloride to teritary amine are between 2:1 and 1:4. This preference for a mild Friedel-Crafts type catalyst is in contradistinction to the cross-linking of aromatic polymers which has hitherto been accomplished by aliphatic cross-linking agents. U.S. patent specification No. 2,292,164 required the use of a strong Friedel-Crafts catalyst to cross-link an aromatic compound with an aliphatic cross-linking agent even although the cross-linking reaction is not carried to completion.

Pressure may be applied, for instance when forming in a mould or press, but it is not essential for the success of the process.

If the reaction is taken to completion, and particularly if the final product is subjected to postcuring at an elevated temperature the products obtained are substantially free from halogen (i.e., they contain 1% of halogen or less.)

The extent of cross-linking can be readily controlled by varying the amount of cross-linking agent to produce, if desired, an intractable highly cross-linked polymer having high chemical inertness and thermal stability.

It has been found that the present process can produce polymeric materials of a greater thermal stability than established commercial products, for example, those based upon phenol and formaldehyde.

Typical examples of tractable polymers which may be cross-linked by the process of the present invention between aromatic nuclei which are incorporated in the polymer backbone include hydrocarbon polymers consisting essentially of linear chains of repeating alternate phenylene and methylene radicals; hydrocarbon polymers consisting essentially of repeating polyphenyl radicals, and hydrocarbon polymers consisting of essentially linear polymers containing repeating fused ring aromatic hydromatic hydrocarbon radicals.

Typical examples of tractable polymers which may be cross-linked between aromatic nuclei which are pendant from the polymer backbone include: poly(arylsiloxane) polymers; polystyrene, such as, the methyl substituted polystyrenes and α-, β-, o-, m-, or p-substituted polystyrenes; novolacs formed my condensation between phenol and formaldehyde; aniline-formaldehyde polymers; N-aryl substituted borazole polymers; aromatic polyesters; polymers containing ferrocene residues; polymers containing thiophene residues; and polymers containing furan residues.

The invention is particularly applicable to the production of highly cross-linked intractable polymers in two stages.

This two stage process comprises a first stage of reacting in the liquid phase at a temperature between about 80° and 250° C. a monomeric compound represented by the structure H—R—H, wherein R is a bivalent group containing an aromatic nucleus, with a paraxylylene dihalide represented by the structure

wherein X and Y are chlorine, bromine or iodine atoms, to form a tractable linear polymer represented by the structure

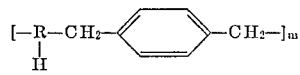

wherein $m$ is a number from 5 to 15, and a second stage of reacting said tractable polymer with a cross-linking agent represented by the structure

wherein X and Y are chlorine, bromine or iodine atoms at temperatures between 150° C. and 500° C. to form a cross-linked thermally stable polymer.

In the second stage the reaction is carried out as previously described for the cross-linking of a relatively low molecular weight polymer to a highly cross-linked intractable polymer.

For the most advantageous use of the two-stage process the first stage should be arranged to proceed as near as possible to the gelling point to reduce the amount of reaction necessary in the second stage. This may be done either by stopping the reaction at the required stage, for instance by cooling, or by using a carefully regulated amount of cross-linking agent. In this way the minimum amount of hydrogen halide is eliminated in contact with the finished article and the cross-linking process is shortened.

Monomeric compounds H—R—H to which the two-stage process can be applied must contain at least one aromaic nucleus that is not substituted with a strongly electron-withdrawing group and include such compounds as lower polyphenyl such as biphenyl, terphenyl, and quaterphenyl; fused ring aromatic hydrocarbons having up to 16 carbons such as anthracene, phenanthrene, triphenylene, pyrene and fluorene; aryl esters of inorganic acids such as triphenyl phosphate and tritolyl phosphate; low molecular weight arylsiloxanes such as octaphenylcyclotetrasiloxane, octaphenyltrisiloxane, and hexaphenyldisiloxane; aryl N-substituted borazoles such as N-triphenylborazole, B-methyl-N-triphenylborazole and methyldiphenylborazole; and metallocyclopentadienyl sandwich compounds, such as ferrocene.

The process that produces a cross-linked intractable polymer may be carried out so as to produce an article consisting entirely of polymer. Also while the polymer is still tractable, it may be impregnated in a suitable fibrous material, for example, glass cloth or abestos fibre mat, or silica fibrous material and the final cross-linking carried out to produce a highly cross-linked polymer which is structurally reinforced with fibrous material.

A difficulty in manufacture or a single defect in a physical property of a particular resin produced in accordance with the processes described above may severely reduce the practical value of certain otherwise valuable resins having many desirable properties.

Thus, for example, asbestos felts impregnated with a stable heat-resistant resin may be too stiff and readily crack and blister badly on curing. On the other hand, an otherwise satisfactory resin may require an excessively long curing time.

The various technological defects of particular resins may be overcome by blending each resin with one or more other resins in the process of manufacture. Resins which are cross-linked through the same cross-linking group, i.e., the xylylene group, are in general mutually soluble so that they readily blend and form a homogeneous film. If the resins to be blended are formed at a similar rate at a given temperature it may be convenient to produce a mixed resin, but in general this is not so and the resins are far more readily prepared separately and the blend produced by simply mixing them together in a mutual solvent.

Although each resin used in a blend may have a technological defect, these defects can be obscured in the blend resin so that it shows only the good properties, or a blend of the good properties, of each resin. Thus, as a result, resins may be produced having new and advantageous properties such as improved adhesion or durability, or improved curing characteristics, which cannot be, or cannot so readily be, produced by other manufacturing processes.

For example, asbestos felts impregnated with a siloxane resin (produced by the action of p-xylylene dichloride on octaphenylcyclotetrasiloxane) are, when dried, extremely stiff and can crack badly if bent. Also, after curing and post curing the felts blister badly. On the other hand, asbestos felts impregnated with a phosphate resin (made by the action of p-xylylene dichloride on triphenyl phosphate) are soft and pliable when dried, do not crack, but are somewhat sticky. Curing at about 200° C. for four hours followed by a postcure of about two days at 200° C. is necessary for the felts to acquire acceptable strength and stiffness. The felts however do not blister at all in spite of the prolonged heat treatment.

An impregnated felt may be produced which has even better physical properties than the rigorously cured felts impregnated with the phosphate resin without requiring so long a time to cure, by impregnating the felt with a blend of the siloxane resin with about one third of its weight of the phosphate resin.

Also, asbestos felts impregnated with an N-triphenylborazole resin (produced by the action of p-xylylene dichloride on N-triphenylborazole) are stiff and brittle and are not strong mechanically. However a diphenyl oxide resin impregnated felt has no gross technological fault and by blending N-triphenylborazole resin with about twice its weight of diphenyl oxide resin strong impregnated felts and not so stiff or brittle as N-triphenylborazole impregnated felts may be obtained.

The invention will now be illustrated by the following examples in which are described: the preparation of tractable resins from the monomeric compounds benzyl chloride (Example 1), 2-phenyldibenzothiophene (Example 4), ethylene glycol and terephthalic acid (Example 5), diphenyl-silane-diol (Example 6), octaphenylcyclotetrasiloxane (Examples 7, 22 and 24) o-, m- and p-terphenyls (Examples 10, 11 and 12), ferrocene (Example 13), dibenzothiophene (Example 15), 2-phenyl-dibenzothiophene (Example 14), tri-N-phenylborazole (Example 16), B-methyl-tri-N-phenylborazole (Example 17), B-phenyl-tri-N-phenylborazole (Example 18), triphenylene (Example 20) and the cross-linking of these tractable polymers with p-xylylene dichloride to form thermally stable, intractable cross-linked polymers.

Example 1

250 grams of benzyl chloride were heated under reflux conditions, with an air condenser, with 1% w./w. stannic chloride catalyst. There was a vigorous evolution of hydrogen chloride and the liquid gradually hardened. Heating was continued until the melting point of the resin in the flask had risen to 80° C. 5 grams of this fusible polybenzyl resin (soluble in chloroform and with a melting point of 80° C.) were powdered and intimately mixed with 2.5 grams of p-xylylene dichloride and further stannic chloride catalyst. The mass was heated, and at 113° C. (approx.) and again at 130°–135° C. hydrogen chloride was evolved. On raising the temperature still further a rapid gelating of the mass occurred.

A sample of the cross-linked resin thus made was heated in air for 5 hours at 300° C. without loss of weight. By comparison a sample of a typical one-stage ammonia-catalysed phenol/formaldehyde resin when heated under the same conditions lost 10% weight and at an increasing rate as the test proceeded.

Example 2

5 grams of p-xylylene dichloride and 10 grams of polybenzyl resin were heated to 120° C. for 15 minutes to bring about partial cross-linking. The mass was cooled and dissolved in chloroform to form a solution. This solution was then used to impregnate an asbestos felt by simple absorption. After drying the felt was cured in a press at 150° C., to yield an asbestos reinforced highly cross-linked resin.

Example 3

The solution of Example 2 was used to impregnate a portion of woven glass fabric. After evaporation of the solvent, the cloth was heated in an oven at 160° C. to bring about cure. The product resin was cross-linked and was no longer soluble in the original solvent.

Example 4

A polymer was made by mixing 2-phenyldibenzothiophene (2 g.) and p-xylylene dichloride (1 g.) with a few drops of a 10% solution of stannic chloride in o-dichlorobenzene and heating the mixture at 150° C. in the melt. A low molecular weight polymer was first formed and then by maintaining this temperature cross-linking and gelation occurred. The resulting highly cross-linked product had a high resistance to thermal degradation, losing weight only very slowly at 400° C.

Example 5

A polyester resin was made by condensing ethylene glycol and terephthalic acid in equimolar proportions at 200° C. under an atmosphere of nitrogen until evolution of water slackened. This polyester resin (2 g.) was then reacted with p-xylylene dichloride (1 g.) in the melt, with a few drops of a 10% solution of stannic chloride in o-dichlorobenzene added as catalyst. A cross-linked polymer was formed.

Example 6

A silicone resin was made from diphenyl-silane-diol by heating this monomer gently in the melt at 120° C. until evolution of water slackened. This silicone resin (2 g.) having a molecular structure with pendant phenyl groups on the polymer chains, was reacted with p-xylylene dichloride (1 g.) in the presence of a little stannic chloride solution as a catalyst, as in Example 5 and a cross-linked polymer was formed.

Example 7

Octaphenyl cyclotetrasiloxane (6 g.) and p-dichloroxylylene (3 g.) were refluxed in solution in 1,2-dichloroethane (33 g.) in the presence of a little stannic chloride catalyst (added as a few drops of a 10% solution of stannic chloride in 1,2-dichloroethane). Hydrogen chloride was evolved and after four hours heating the solution, now containing a soluble polymer resin, was cooled.

Some of this resin solution was reheated, and when heated strongly evolved more hydrogen chloride and yielded a solid cross-linked resin, which after cooling was powdered and reheated to remove volatile solvent and occluded hydrogen chloride. A sample of the powdered resin was then tested for heat-stability on a Stanton thermobalance and was shown to undergo no weight loss at 300° C., and only 0.35% per hour at 350° C. and 1% per hour at 400° C.

Example 8

A mat of chrysotile asbestos fibres was thoroughly saturated with some of the solution of soluble resin prepared in Example 7. The mat was then dried in air, firstly at room temperature and then at 100° C. for five minutes, to remove the solvent. The dried impregnated mat was cured for 1 hour at 160° C. in a hydraulic press to bring about cross-linking and a firm board was obtained. This board was subjected to a postcure at 180° C. for a further hour, and then the final product was a strong board of asbestos reinforced cross-linked resin.

Example 9

A layer of glass cloth (satin weave 0.010 in. thick) was saturated with more of the resin solution as produced in Example 7, dried in air, cut and stacked and cured under pressure at 160° C. for 1 hour, as for the board in Example 8. A postcure at 180° C. for 1 hour was similarly given to the resultant board of reinforced cross-linked resin.

Neither this laminated glass-fibre reinforced board nor the asbestos reinforced board of Example 8 was seriously affected by exposure to a temperature of 280° C. for 16 hours.

Example 10

A composition known as Santowax R, containing o-, m- and p-terphenyls, of low melting point, was mixed with approximately 1.3 molar proportions of p-xylene dichloride and a few drops of 10% stannnic chloride solution in o-dichlorobenzene as catalyst, and the mixture was reacted in the melt at 170° C. Hydrogen chloride was evolved vigorously and a polymer was formed; on continued heating more hydrogen chloride was evolved and cross-links were formed until eventually the evolution of hydrogen chloride slackened and whole mass had set to a solid gel. The cross-linked resin was postcured at 240° C. for 48 hours to yield a final product which had good thermal stability.

Example 11

485 grams of the commercial mixture of terphenyls known as Santowax R and 275 grams of p-xylylene dichloride were dissolved in 1575 grams of 1,2-dichloroethane. A catalyst consisting of 42 grams of a 10% w./w. solution of stannic chloride in 1,2-dichloroethane was added and the whole brought to reflux.

The molar ratio of terphenyl/p-xylylene dichloride was 4.0 moles to 3.0 moles, i.e., the terphenyl was in excess of true stoichiometric proportions.

Evolution of hydrogen chloride took place, the total mass being evolved being determined continuously by measurement of weight loss, and also by absorption of the evolved hydrogen chloride in water and titration of this aqueous solution with standard alkali. When substantially all the chlorine had been removed from the reaction mixture a second portion (201.5 grams) of p-xylylene dichloride was added. Hydrogen chloride was again evolved briskly and the reaction was allowed to continue until about one third of the chlorine in the second portion of p-xylylene dichloride had been removed. On cooling, a stable solution of a heat-reactive resin was obtained. The amount of p-xylylene dichloride added on the second occasion brought the ratio of terphenyl/p-xylylene dichloride of 1.0/1.3 moles.

By contrast it was found that where the condensation was allowed to proceed in a single stage (i.e., with an initial ratio of terphenyl/p-xylylene dichloride of 1.0/1.3 moles) gelation occurred at about 63% loss of total chlorine, whereas with the process described above gelation did not occur until about 69.5% loss of total chlorine; that is the reaction was taken to 63% loss of chlorine without gelation occurring, a stable, fluid solution being maintained. This results in the elimination of the maximum amount of hydrogen chloride during the stage of tractable resin manufacture rather than during a second stage, cross-linking process, for example moulding of a product. If the first stage only is carried out, i.e., the solution is cooled when most of the total chlorine has been evolved, and the solvent is allowed to evaporate from this solution, a brittle, thermoplastic resin is obtained, which is substantially a linear polymer.

Example 12

A first stage polymerisation reaction between a mixture of terphenyl and p-xylylene dichloride was performed as follows. The terphenyl mixture (368 g.) and p-xylylene dichloride (209 g.) were heated together with 4 ml. of a 10% w./w. solution of stannic chloride in 1,2-dichloroethane (i.e., the molar ratio of terphenyls to p-xylylene dichloride was 4:3). The temperature was maintained at 150–165° C. A vigorous evolution of hydrogen chloride occurred, which was monitored by absorption of the gas in water and titration of this solution with standard alkali. After 6 hours the reaction was substantially complete and the contents of the reaction vessel were poured on to a stainless steel plate and allowed to harden.

The product was a pale brown, clear, brittle resin. It gave a yellow solution when dissolved in 1,2-dichloroethane. The melting point lay in the range 80°–110° C., i.e., softening began at 80° C. but full liquefaction did not occur until 110° C. This material could be stored without deterioration for long periods.

In a subsequent step cross-linking of the soluble resin was carried out by the addition of more p-xylylene dichloride to bring the total ratio of terphenyl to p-xylylene dichloride to 1.0:1.1, in the following way. The soluble yellow resin (49 g.) was dissolved in 1,2-dichloroethane (122 g.), p-xylylene dichloride (10 g.) was added and the whole mixture was refluxed with 1 ml. of catalyst solution (a 10% w./w. solution of stannic chloride in 1,2-dichloroethane). After two hours gelation occurred and a cross-linked resin was obtained which had good heat-resistant properties.

The cross-linking reaction could be interrupted if desired, by cooling the mixture (e.g., after 1½ hours of reflux), and the partially cross-linked, but still quite soluble, resin used in solution to impregnate mats of reinforcing material, before they were given a final heat-cure.

Example 13

Ferrocene (10 g.) and p-xylylene dichloride (10 g.) were mixed in a glass reaction vessel and slowly heated in air without a catalyst until the reactants melted. At the melting temperature reaction occurred leading to the evolution of hydrogen chloride and the formation of a fusible tractable polymer. Further sustained heating of the system lead to gelation of the melt and the production of a hard, infusible, cross-linked polymer.

Example 14

10 g. of 2-phenyldibenzothiophene and 10 g. of p-xylylene dichloride were mixed together and reacted in the melt without a catalyst as described in Example 13 for the preparation of a polymer from ferrocene. Again firstly condensation polymerisation and secondarily cross-linking occurred, to yield finally a hard infusible, cross-linked polymer.

Example 15

10 g. of dibenzothiophene and 10 g. of p-xylylene dichloride were reacted together in the melt as in Example 13. The final cross-linked product obtained was again hard and infusible.

Example 16

Tri-N-phenylborazole (2 g.) and p-xylylene dichloride (2 g.) were melted together and 0.1 ml. of catalyst solution (a 10% w./w. solution of stannic chloride in 1,2-dichloroethane) was added.

There was a smooth evolution of hydrogen chloride, and a fusible polymer was formed. The reaction mixture gradually increased in viscosity on continued gentle heating and after about seven minutes, as cross-linking occurred, the gas bubbles grew bigger and the mixture rose up inside the reaction vessel as a thick frothy mass.

The mixture was then heated more strongly until it set in the form of a hard, highly cross-linked, foamed resin, pale yellow in colour. This solid foam was powdered in a mortar and heated for a further 1½ hours at 200° C. to remove volatile products of the reaction.

Example 17

This was a repeat of Example 16 but using 2 g. of B-methyl-tri-N-phenylborazole in place of the tri-N-phenylborazole reactant. A hard, infusible, cross-linked final product was obtained which was similarly powdered and reheated to remove volatiles as in Example 17.

Example 18

This was a repeat of Example 16 with 2 g. of B-phenyl-tri-N-phenylborazole as the borazole reactant. The hard, infusible, cross-linked product resin which was obtained was powdered and reheated to remove volatiles as in Example 17.

On testing the polymers from Examples 16, 17 and 18 for heat loss at elevated temperatures it was found that there was only 10–15% weight loss on heating each polymer to 300° C. Thereafter each of the polymers lost less than 2% by weight at 300° C. in a further 14 hours. On further heating to 600° C. a strong resinous residue with between 50% and 60% of the original resin weight was obtained.

Example 19

A sample of glass fibre cloth was impregnated with the resin solution of Example 16 at a stage of cross-linking of the resin when it was still soluble. The impregnated cloth was dried and was cured in an air oven at 200° C. for 4 hours to continue the cross-linking reaction to completion. The product was then a hard strong board.

Example 20

2 g. of triphenylene were mixed with 1 g. of p-xylylene dichloride and the mixture gently heated. A very small quantity (about 3 drops) of the 10% w./w. solution of stannic chloride in 1,2-dichloroethane was added. A steady evolution of hydrogen chloride began and a fusible polymer was formed. The heating was continued to bring about cross-linking and the mixture became viscous, then gelled and rose in the reaction vessel, eventually becoming a hard, yellow thermoset, cross-linked foam. This resin foam was found to have excellent thermal stability at 300° C. suffering no measurable weight loss in 24 hours at that temperature.

Example 21

Example 20 was repeated but the heating was stopped when a fusible, soluble resin had been formed, and the resin thus made was dissolved in 1,2-dichloroethane and the solution was used to impregnate a glass fibre mat which was then heated at 160° C. for 2 hours to cure the impregnant (i.e., complete the cross-linking process). The resulting product was a fibre-reinforced board of high strength and possessed of great resistance to thermal degradation. The weight loss of the laminate is less than 17% per hour at 300° C.

Example 22

A siloxane resin solution is produced by refluxing octaphenylcyclotetrasiloxane (400 g.) with p-xylylene dichloride (160 g.) in a solvent comprising p-dichlorobenzene (510 g.) and 1,2-dichloroethane (100 g.) in the presence of a small amount (0.5 g.) of stannic chloride. The reaction is allowed to proceed until sufficient hydrogen chloride has been evolved to consume 500 ml. of 2 N sodium carbonate solution. A phosphate resin solution is produced by refluxing triphenyl phosphate (650 g.) with p-xylylene dichloride (350 g.) in a solvent (o-dichlorobenzene, 480 g.) in the presence of a small amount (2 g.) of stannic chloride. The reaction is allowed to proceed until 1100 ml. of 2 N sodium carbonate solution has been consumed by the hydrogen chloride evolved. 50 g. of the siloxane resin solution and 15 g. of the phosphate resin solution are taken and diluted to 375 g. by addition of 1,2-dichloroethane.

Into the blended solution contained in a rectangular shallow tray, is placed a 12" x 12" felt of chrysotile asbestos fibre weighing 40 g. The solution is completely and uniformly absorbed by the felt. The felt is transferred to a drying rack allowing free circulation of air and dries to constant weight after 36 hours. Eight such felts are stacked between sheets of fluorinated ethylene/propylene film as parting agent and pressed between stainless steel cauls at 150 p.s.i., and 160° C. for two hours. The board is postcured at 200° C. for 24 hours. The final resin content obtained is about 48%.

Boards produced by this process are consistently of very high quality.

Example 23

A catalyst solution was prepared by adding 2 g. ferric chloride and 2 g. triphenylamine to 50 ml. of 1,2-dichloroethane and mixing to obtain a homogeneous solution.

1,000 g. of benzyl chloride were heated at the reflux temperature. There was no reaction until 1 ml. of the catalyst solution was added, then rapid evolution of hydrogen chloride in copious fumes began instantly. The contents of the flask turned from colourless to yellow and increased in viscosity. After one hour the evolution of hydrogen chloride slackened and the contents of the flask were poured out. A hard, brittle resin was obtained which melted at a temperature within the range 70–80° C.

By way of comparison, the polymerisation reaction is the presence of anhydrous stannic chloride as catalyst requires a catalyst concentration of ½% to 1% by weight of the benzyl chloride, the reaction is slower (requiring 2 to 4 hours under reflux) and the melting range of the polymer is 65–75° C.

Example 24

A solution of ferric chloride/triphenylamine catalyst was made by dissolving 2 g. of anhydrous ferric chloride and 4 g. of triphenylamine in 180 g. of o-dichlorobenzene and 20 g. of 1,2-dichloroethane.

A resin was prepared by heating together under reflux 500 g. of diphenyl ether and 500 g. of p-xylylene dichloride, dissolved in 300 g. of o-dichlorobenzene and 60 g. of 1,2-dichloroethane. There was no reaction until 2.5 ml. of the modified ferric chloride catalyst solution was added. Hydrogen chloride was then smoothly evolved and was led into a neutralizing vessel containing 2 N alkali. Heating was continued for 21 hours during which period hydrogen chloride sufficient to neutralize, 1,950 ml. of 2 N alkali was evolved. Heating was discontinued and the reaction stopped by an addition of 2 ml. of propylene glycol.

The resin thus prepared was a shelf life of six months.

When this resin solution is used to prepare a cross-linked solid, product resin the same modified ferric chloride catalyst may be added in the ratio of 1 ml. of catalyst solution to 80 ml. of resin solution.

Example 25

5 g. novolac resin and 1 g. p-xylylene dichloride are melted together and found to be compatible. After a few minutes the mass thickens and sets as a pink porous block. Whereas before the experiment both novolac and p-xylylene dichloride are freely soluble in methylethylketone, after fusion the resinous product is completely insoluble.

Example 26

6 g. of novolac resin and 1 g. of p-xylylene dichloride are dissolved in 10 g. of ethylene glycol monomethyl ether to give a very pale yellow solution. One drop of a 10% solution of $SnCl_4$ w./w. in o-dichlorobenzene is added and after heating for a few minutes the solution increased in viscosity and darkened to a deep brown colouration. The solvent is evaporated at 130° C. to give a strong resinous product, in contrast to the original novolac which was extremely weak and brittle.

The following example was carried out with an aniline-formaldehyde resin prepared by reflushing for one hour aniline (1 mole, 93 g.), formaldehyde (0.8 mole, 24 g.) and oxalic acid (2 g.); and vacuum distilling to remove by products. The liquid resin produced set on cooling to form a light yellow resin which was very weak and brittle.

Example 27

5 g. of the aniline-formaldehyde resin and 40.5 g. of p-xylylene dichloride are heated together. A fast reaction takes place, with melting and solidification almost the same time. The colour rapidly darkens to a brown/black. The resulting thermoset resin is hard and strong.

The very significant improvement in strength at high temperatures obtained with these new resins is illustrated by the following comparative table of the properties of identically prepared resin-bonded asbestos laminates.

| Bonding Resin | Laminate properties | |
|---|---|---|
| | Aged at 200° C. | Aged at 300° C. |
| Conventional phenolic resin. | All flexural strength lost after 2,000 hours. | All strength lost after 5 hours. |
| Cross-linked polybenzyl resin of the present invention. | Flexural strength after 4,000 hours, 24,800 lbs./sq. in. | All strength lost after 100 hours. |
| Cross-linked siloxane resin of the present invention. | Flexural strength after 6,000 hours, 18,700 lbs./sq. in. | Flexural strength after 200 hours, 14,000 lbs./sq. in. |

I claim:
1. A process for producing a cross-linked, thermally stable polymer which comprises
reacting a cross-linking agent which is a paraxylylene dihalide represented by the structure

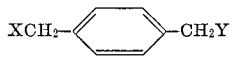

wherein X and Y are halogen atoms selected from the group consisting of chlorine, bromine and iodine atoms, at temperatures between about 150° and 500° C. in the presence of, as the catalyst, 0 to about 1 molar percent of a mild Friedel-Crafts type catalyst calculated on the amount of said paraxylylene dihalide present with a tractable linear polymer having a molecular weight of less than 20,000 which is
   a hydrocarbon polymer containing repeating alternate phenylene methylene radicals,
   a hydrocarbon polymer containing repeating lower polyphenyl radicals,
   a hydrocarbon polymer containing repeating fused ring aromatic hydrocarbon radicals,
   a poly(arylsiloxane),
   polystyrene and methyl-substituted polystyrenes,
   an aromatic polyester,
   an aniline-formaldehyde polymer,
   a phenol-formaldehyde polymer,
   an N-aryl substituted borazole polymer,
   a polymer containing ferrocene residues,
   a polymer containing thiophane residues, or
   a polymer containing furan residues,
said polymer having cure sites represented by the structure

wherein R comprises a bivalent cyclic organic group and H is directly substituted on such cyclic group, for a period of time sufficient for said cross-linking agent to cross-link chains of said polymer with elimination of halogen acids HX and HY formed from hydrogen atoms substituted at the cross-linking sites of said polymer and the halogen atoms of said cross-linking agent so as to provide a cross-linked, thermally stable polymer.

2. A process as in claim 1 wherein said reaction is carried out in the presence of, as the catalyst, stannic chloride.

3. A process as in claim 1 wherein said tractable linear polymer is reacted at between 150° and 250° C.

4. A process for producing a cross-linked thermally stable polymer which comprises
reacting in the liquid phase at a temperature between about 80° and 250° C.
   a monomeric organic compound represented by the structure H—R—H wherein R is a bivalent organic group comprising a cyclic organic radical having at least one hydrogen atom substituted thereon and said organic compound is selected from the group consisting of
      dibenzothiophene,
      2-phenyl dibenzothiophane,
      a lower polyphenyl,
      a polyphenyl cyclotetrasiloxane, trisiloxane or disiloxane,
      ferrocene,
      an aryl ester of phosphoric acid,
      a fused ring aromatic hydrocarbon,
      and an N-aryl substituted borazole,
   with a paraxylylene dihalide represented by the structure

wherein X and Y are chlorine, bromine or iodine atoms, to form a tractable linear polymer represented by the structure

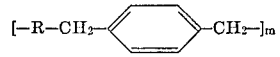

wherein m is a number from 5 to 15, and reacting said tractable polymer having cross-linking sites

wherein the hydrogen atom is directly substituted on said cyclic group with a cross-linking agent represented by the structure

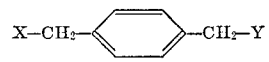

wherein X and Y are chlorine, bromine or iodine atoms, at temperatures between 150° C. and 500° C. in the presence of, as the catalyst, 0 to about 1 molar percent of a mild Friedel-Crafts type catalyst calculated on the amount of said cross-linking agent for a period of time sufficient for said cross-linking agent to cross-link chains of said polymer with elimination of halogen acids HX and HY formed from hydrogen atoms substituted on the cyclic groups at said cross-linking sites of said polymer and the halogen atoms of said cross-linking agent so as to provide a cross-linked, thermally stable polymer.

5. A process as in claim 4 wherein said monomeric organic compound is reacted at between 80° and 200° C.

6. A process as in claim 4 wherein said catalyst is stannic chloride.

7. A process as in claim 4 wherein said catalyst is a mixture of ferric chloride and an organic complexing tertiary amine.

8. A process as in claim 7 wherein the organic complexing tertiary amine is triphenylamine.

9. The product of the process of claim 1.

10. The product of the process of claim 4.

References Cited

UNITED STATES PATENTS

| | | | |
|---|---|---|---|
| 2,472,495 | 6/1949 | Sparks et al. | 260—88.1 |
| 2,734,045 | 2/1956 | Nelson | 260—77.5 |
| 2,752,322 | 6/1956 | Knust. | |
| 3,072,484 | 1/1963 | Unruh et al. | 260—88.3 |
| 3,171,818 | 3/1965 | Sander | 260—2 |
| 3,265,640 | 8/1966 | Overhults et al. | 260—2 |
| 3,294,531 | 12/1966 | Schlesinger | 260—2 |

FOREIGN PATENTS 83,559  7/1964  France.

OTHER REFERENCES

German application No. 1,070,376, printed December 1959, Dumont et al.

SAMUEL H. BLECH, *Primary Examiner.*

U.S. Cl. X.R.

117—126, 140; 161—193; 260—2.5, 46.5, 47, 59, 72.5, 75, 79, 80, 88.5, 93.5